United States Patent [19]
Davis

[11] Patent Number: 5,083,547
[45] Date of Patent: Jan. 28, 1992

[54] AIR AND FUEL MIXING APPARATUS

[75] Inventor: Robby E. Davis, Riverdale, Ga.

[73] Assignee: Davis Family Trust, Atlanta, Ga.

[21] Appl. No.: 702,082

[22] Filed: May 17, 1991

[51] Int. Cl.$^5$ .............................................. F02B 43/00
[52] U.S. Cl. ...................... 123/527; 48/180.1
[58] Field of Search ............ 123/525, 527, 590; 261/39, DIG. 16; 48/180.1

[56] References Cited

U.S. PATENT DOCUMENTS

| | | | |
|---|---|---|---|
| 2,927,848 | 3/1960 | Baverstock | 123/527 |
| 4,387,689 | 6/1983 | Brown | 123/525 |
| 4,398,521 | 8/1983 | Schuurman | 123/527 |
| 4,399,795 | 8/1983 | Brown | 123/527 |
| 4,425,140 | 1/1984 | Lassanske | 48/180 C |
| 4,425,898 | 1/1984 | McLean | 123/527 |
| 4,479,466 | 10/1984 | Greenway et al. | 123/527 |
| 4,494,515 | 1/1985 | Brown | 123/527 |
| 4,497,304 | 2/1985 | Wintrell et al. | 123/527 |
| 4,553,523 | 11/1985 | Stohrer | 126/9 B |
| 4,703,742 | 11/1987 | Bennett | 123/527 |
| 4,872,440 | 10/1989 | Green | 123/590 |

Primary Examiner—Noah P. Kamen
Attorney, Agent, or Firm—Kennedy & Kennedy

[57] ABSTRACT

An apparatus 10 for introducing a mixture of air and gaseous fuel into internal combustion engines has a housing 12, in communication with a supply of gaseous fuel, that is mounted to a tubular intake port 11 of the engine carburetor. The apparatus has a control tube 26 which adjustably extends into the housing 12 to positions close to but spaced from the housing to form a gap 50 therebetween. A honeycomb air flow restriction plate 33 is mounted in the control tube. By repositioning the control tube the size of the gap 50 may be altered to adjust the air to gas mixture ratio. During engine operation the restriction plate creates a pressure differential that serves to draw gaseous fuel form the housing about the control tube into the airstream passing through the control tube into the port.

12 Claims, 2 Drawing Sheets

AIR AND FUEL MIXING APPARATUS

TECHNICAL FIELD

This invention to apparatuses for introducing a mixture of air and gaseous fuel into internal combustion engines.

BACKGROUND OF THE INVENTION

The air pollution problems inherent in the operation of gasoline fueled and diesel oil fueled internal combustion engines are well known. For this reason various emission control devices are presently in use, and indeed are required by federal regulations, to reduce the amount of pollutants discharged into the atmosphere by internal combustion engines. These emission control devices, however, only remove a portion of the pollutants and are subject to deterioration with the passage of time. Also, they often hinder engines from operating at peak efficiencies.

Natural gas has been proposed as a substitute fuel for gasoline and diesel oil. It has the capability of producing less combustion pollutants and for decreasing engine operating costs without complex emission control devices. Obviously, its use would also reduce the rate of world fossil fuel consumption.

As the transportation infrastructure of today does not include large numbers of widely disbursed retail suppliers of natural gas for vehicles, it is not practical to produce vehicles that are fueled solely by gaseous fuels like natural gas due to range limitations. To evolve towards such it is more practical to equip vehicles with a supply of both a liquid fuel such as gasoline or diesel fuel and an auxiliary supply of gaseous fuel such as natural gas. To do that efficiently it is essential that as little retrofitting be done as possible to existing fuel intake systems and configurations.

Various devices have been developed for mixing natural gas and air for introduction into an engine. For example, conversion kits have been designed for installation onto carburetors. These kits provide a dual fuel system that permits operation of the engine on liquid fuel alone, on gaseous fuel alone, and in some systems on combinations of the two.

One type of such a kit provides a gaseous dispensing device mounted within an intake conduit that funnels air to the engine air filter. Exemplary of this type is that shown in U.S. Pat. No 4,494,515. A problem associated with this type of kit is that original automobile parts must be substantially modified in order to accommodate it. Once these modifications are made the modified part must be replaced or repaired, should the device be removed. Another problem associated with it is that the proper air to gas mixture is achieved through limiting the flow of gaseous fuel passing through the device into the engine air stream. This limitation results in limiting gas consumption rate throughout the entire range of gas flow rate needs.

Another type of kit achieves a proper mixture of gas and air by limiting the amount of air entering the carburetor. The mixture is adjusted by increasing or decreasing air flow by typically providing a movable plate which limits the spacing through which air entering the engine may flow. This limitation however results in limiting the performance of the engine. Exemplary of these types of devices are those shown in U.S. Pat. Nos. 4,425,140, 4,425,898, and 4,387,689. Once again, these devices require substantial modifications to be made to conventional parts of the automobile engine.

It thus is seen that an apparatus for mixing gaseous fuel and air together for introduction into an internal combustion engine without complex and costly modifications to the engine, and which may be easily adjustable so that the apparatus may be mounted to engines of different sized displacements, has long remained an elusive goal. Accordingly, it is to the provision of such that the present invention is primarily directed.

SUMMARY OF THE INVENTION

In a preferred form of the invention, apparatus for introducing gaseous fuel mixed with air into a tubular intake port of an internal combustion engine has a housing with a top wall with a top opening and a bottom wall with bottom opening, and means for mounting the housing to the tubular intake port. A control tube through which air may be drawn is adjustably mounted to the housing with one end extending through the top opening and another end positioned closely adjacent to but spaced from the housing bottom wall adjacent the bottom opening to form an annular gap therebetween. The apparatus further comprises means through which gaseous fuel may be introduced into the housing about the control tube and air flow restriction means for restricting air flow through the control tube. With this construction, upon engine operations a pressure differential is created between the space inside the control tube and the space outside of the control tube within the housing which serves to draw gaseous fuel from the space within the housing about the control tube into the stream of air passing through the control tube and air flow restriction means and into the intake port.

DETAILED DESCRIPTION

Figure 1:
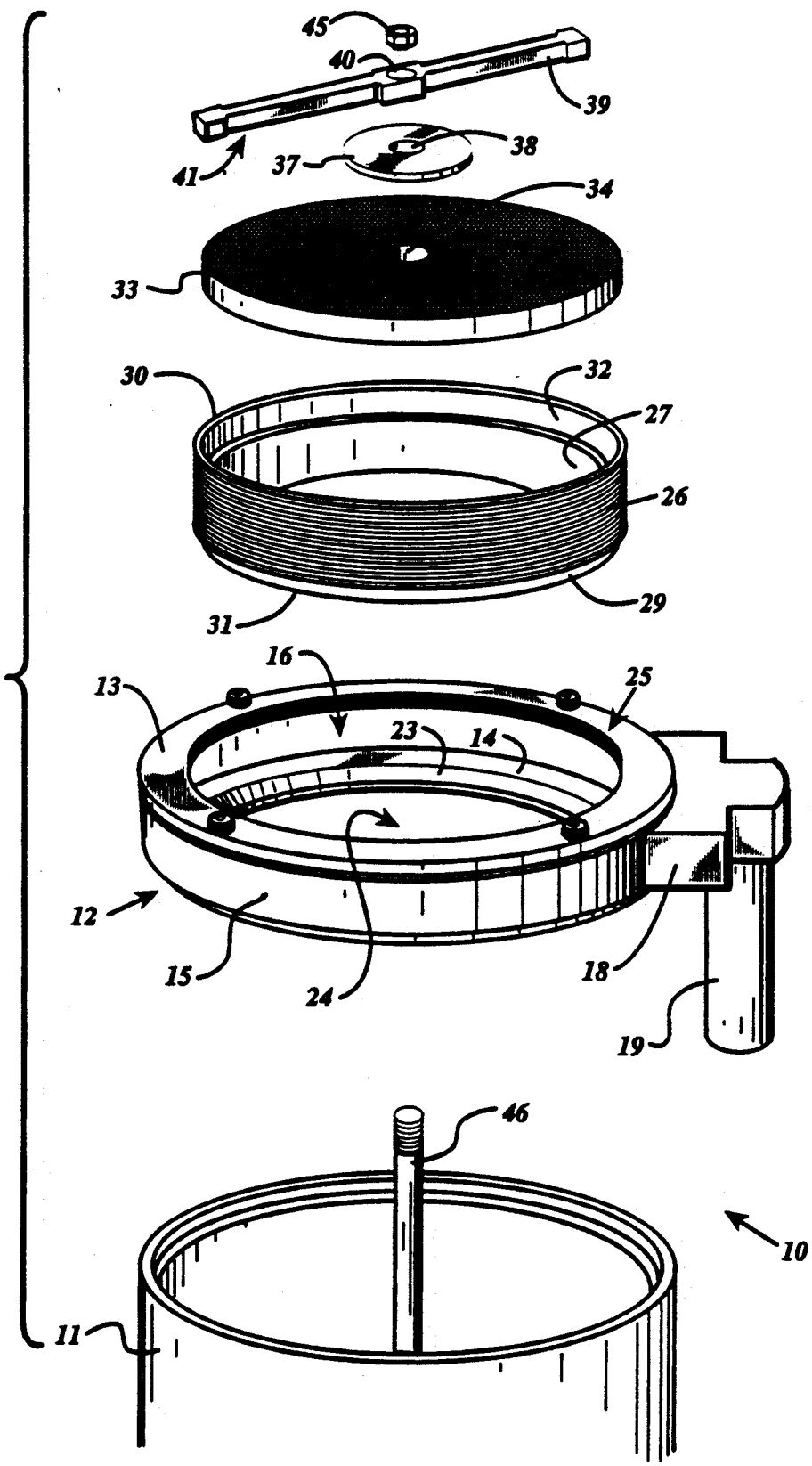
FIG. 1 is an exploded view of apparatus embodying principles of the present invention in a preferred form.
Figure 2:
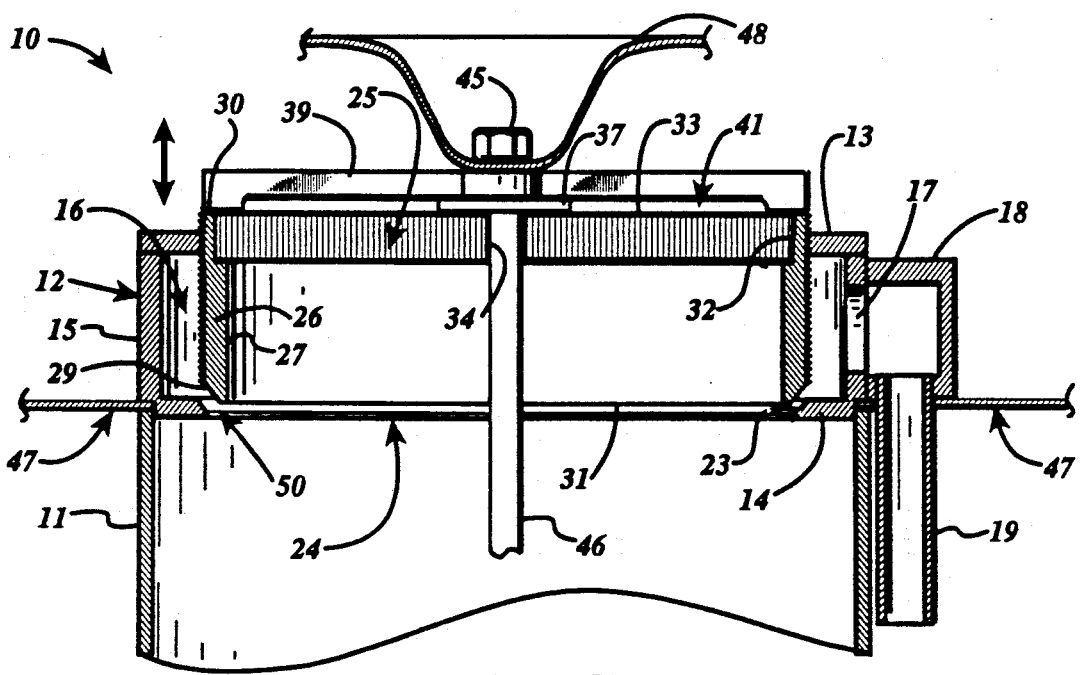
FIG. 2 is a cross-sectional view of the apparatus of FIG. 1 shown in an assembled configuration.

With reference next to the drawing, there is shown an apparatus 10 for introducing gaseous fuel and air into a carburetor intake port 11 of a conventional carbureted type automobile engine. The apparatus 10 includes a housing 12 having an annular top wall 13, an annular bottom wall 14 and a cylindrical side wall 15 which partially define a plenum 16. The housing side wall 15 has a gas intake orifice 17 about which a coupler 18 on the end of a gaseous fuel supply line 19 is mounted through which gaseous fuel may be fed to the plenum 16.

The housing 12 is mounted to the carburetor intake port 11 by sliding the housing slightly into the end of the port with the thin bottom wall 47 of the air filter housing fitted therebetween. The housing bottom wall 14 has a bottom opening 24 defined by a tapered opening side wall 23 which is in axial alignment with the intake port 11. The housing top wall 13 has an internally threaded top opening 25 in axial alignment with its bottom opening 24 and the intake port.

The apparatus 10 has an externally threaded control tube 26 which is threaded through the top opening 25 of the housing so that the control tube is mounted in axial alignment with the intake port 11. The control tube 26 has an inside wall or bore 27 that extends from one tube end 30 towards its other tube end 31. The control tube has an exterior end taper or flare 29 on its end 31.

The control tube bore 27 has a countersink 32 in which is a mounted a honeycombed restriction plate 33 which has a pattern of vertical air passages and an axial mounting hole 34. A solid restriction plate 37, which resembles a metal washer, and which also has an axial mounting hole 38, is mounted atop the restriction plate 33 in axial alignment with it by a holddown bar 39 which also has a central mounting hole 40. The solid restriction plate 37 is preferably sized according to the displacement of the engine.

Figure 3:
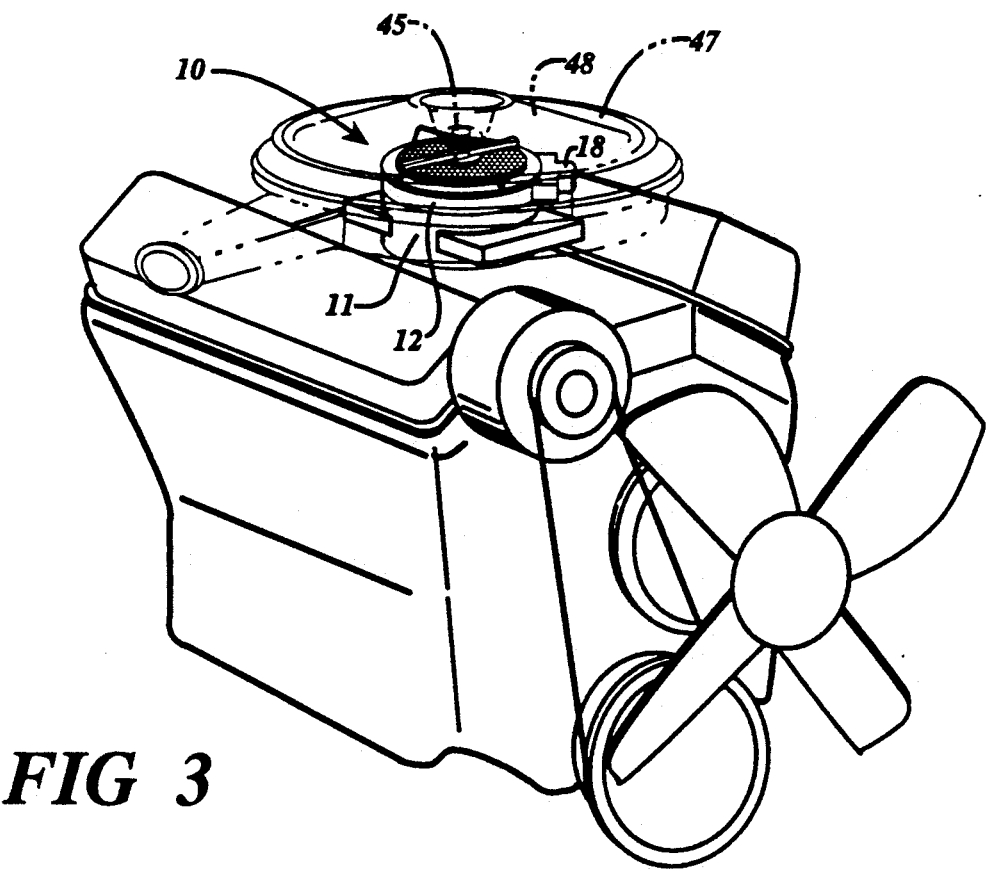
FIG. 3 is a perspective view of the apparatus of FIG. 1 shown mounted to an automobile internal combustion engine.

The apparatus 10 may be easily mounted to an existing automobile engine so that the engine may be fueled by a gaseous fuel only or as an alternative to conventional liquid fuel that is supplied by another, unshown fuel line to the carburetor. This is done by removing the top cover 48 of the air filter housing 47, which is shown in phantom lines in FIG. 3 and which houses an annular air filter, and unscrewing mounting nut 45 from the threaded mounting rod 46 that conventionally extends axially from the carburetor intake port 11. The housing 12 is then mounted on the end of the tubular intake port 11 within the air filter housing with its bottom wall 47 sandwiched therebetween. The control tube 26 is threaded into the housing and the air restriction plates 33 and 37 mounted upon the control tube with the mounting rod 46 projecting upwardly through them and with the holddown bar positioned upon them. A gas line or hose 19, which extends from an unshown tank of pressurized gaseous fuel such as natural gas or propane, through a pressure sensor activated pressure regulator, is then mounted to the coupler 18 that is mounted to the housing side wall 15 and which is in fluid communication with the plenum 16 through the gas intake orifice 17.

Next the apparatus is adjusted to provide peak engine efficiency, i.e. for the best gas to air mixture ratio. This may be done by rotating the control tube 26 in until its flare 29 is stopped against the tapered opening side wall 23 and then counter-rotated one full turn to back the flare 29 off from wall 23. This can produce an annular gap 50 between the flare 23 of the control tube end 31 and the wall 23 of 1/32 inch, for example. The automobile engine is then started and the throttle set so that the engine operates at a constant speed such as 3,000 R.P.M. The control tube is then rotatably adjusted until the maximum R.P.M. level is reached which is indicative of the best fuel to air mixture ratio. The air filter mounting nut 45 is then threaded onto the mounting rod 46 thereby securing the axial position of the control tube within the housing 12 and setting the size of the gap 50 and also securing the several components of the apparatus together.

The control tube may be rotated either by removing the top cover 48 of the air filter housing and rotating it in small increments, replacing the cover between each adjustment, or by inserting a specially designed tool into the housing 47 which may rotate the control tube within the housing with the cover 48 in its fixed position. Though the structure shown in the drawing is preferred, alternatively structures may be employed for positioning and securing the control tube in place in the housing such as, for example, with the use of set screws in which case screw threads may be eliminated.

In operation, natural gas flowing from a pressurized fuel tank is reduced to generally ambient pressure by a conventional pressure regulator. The gaseous fuel passes through the coupled fuel line 19 and into the plenum 16 about the outside of the control tube 26. Operation of engine intake strokes of its pistons within its cylinders create negative air pressure within the engine which induces a flow of air into the carburetor intake port 11 through the air filter and the apparatus 10. As this occurs the honeycomb restriction plate 33 and the solid restriction plate 37 create a drop in pressure within the control tube and intake port 11 which draws natural gas from the plenum 16 into the airstream flowing through the control tube 26 and into the port 11. In other words, the restriction plates decrease the pressure of the air in the region of the control tube below the restriction plates adjacent to the gap 50 which in turn draws gaseous fuel from the plenum 16 through the gap 50 and into the airstream entering the port. Although conventional air filters do restrict this flow of air somewhat, further flow restriction is required here for proper operation of the apparatus 10 in the form of the restriction plates. Nevertheless, the restriction plates do not provide flow restriction to such a degree as to hamper alternative engine operations on liquid fuel, so that air intake to the carburetor may preferably occur through apparatus 10 with either fuel.

The control tube exterior taper 29 and the tapered opening side wall 23 of the housing thus form a size adjustable annular passage through which natural gas, propane or the like may enter and become entrained with the airstream flowing into port 11. The exterior taper 29 also permits an end portion of the control tube to project slightly into the bottom opening 24 of the housing 12. These geometries combine to produce a swirling or eddying motion as the gaseous fuel stream collides with the airstream which causes the gaseous fuel to mix thoroughly with it. The vertically arranged honeycomb pattern of passages of the restriction plate 33 act to separate the airstream into several small airstream which further enhances this entrainment.

The angle of the exterior taper 29 also provides a fine degree of mixture adjustment since it provides a ratio between linear movement of the control tube along its axis and the width of the gap 50 between the tube taper 29 and the side wall 23. For example, a movement of one inch along the tube axis may cause only a one half or one quarter inch change in the width of gap 50. Therefore, very small changes in the gap 50 may be achieved by advancements of the tube.

As the control tube 26 is adjusted towards the bottom opening 24, the flow rate of gaseous fuel entering the port 11 is reduced. This reduction in the quantity of gaseous fuel produces a leaner air to fuel mixture. Conversely, as the control tube is adjusted away from the bottom opening 24, the flow rate of gaseous fuel entering the port is increased in proportion to the increase in the size of gap 50 to produce a richer mixture.

From the foregoing it is seen that air and fuel mixing apparatus is now provided which overcomes problems associated with those of the prior art. It has been found to be easily mounted to engines of various sizes and easily adjusted for maximum fuel efficiency. Though it has been found to work well with natural gas, it may, of course, be used with other forms of gaseous fuel such as propane, methane and the like. Also, although the specific example described herein has been described in conjunction with its use on the intake port of a carburetor, it may also be used with other types of fumigating devices used or intended for use for the introduction of air or combustible fuel into internal combustion engines, including but not limited to port injection systems, throttle body systems, or fuel injection systems. It will thus be understood that the present invention is operable not only with any and all fumigating devices, such as conventional carburetors, for introducing air and combustible fuel into an internal combustion engine, but also with fuel injection systems, throttle body systems, and port injection systems. It should however be understood that the just described embodiment merely illustrates principles of the invention in a preferred form. Many modifications, additions and deletions may, in addition to those expressly recited, be made without departure from the spirit and scope of the invention as set forth in the following claims.

I claim:

1. Apparatus for introducing gaseous fuel mixed with air into a tubular intake port of an internal combustion engine, and with the apparatus comprising a housing having a top wall with a top opening and a bottom wall with a bottom opening; means for mounting said housing to the tubular intake port; a control tube, through which air may be drawn, adjustably mounted to said housing with one end extending through said top opening and another end positioned closely adjacent to and spaced from the housing bottom wall adjacent said bottom opening to form an annular gap therebetween; means through which gaseous fuel may be introduced into said housing about said control tube; and air flow restriction means for restricting air flow through said control tube during engine operations to create a pressure differential between the space inside said control tube and the space outside of said control tube within said housing for drawing gaseous fuel from the space within said housing about said control tube into the stream of air passing through the control tube and into the tubular intake port.

2. The apparatus of claim 1 in combination with an air filter housing mounted to the port about said apparatus.

3. The apparatus of claim wherein said air flow restriction means is mounted within said control tube.

4. The apparatus of claim 1 wherein said control tube is threaded into said housing top opening.

5. Apparatus for introducing gaseous fuel mixed with air into an intake port of an internal combustion engine, and with the apparatus comprising, in combination, a housing adapted to be mounted to an end of the intake port and having a bottom wall formed with a bottom opening in a bottom wall, a top wall formed with a top opening aligned with said bottom opening, and a gas intake orifice;

a control tube sized to be inserted into said housing top opening having a bottom end;

means for adjustably securing said control tube substantially in place within said housing; and air flow restriction means for restricting air flow through said control tube;

whereby upon mounting the housing to the intake port with the control tube bottom end positioned closely adjacent the housing bottom wall to define a gap therebetween and introducing gaseous fuel into the housing through the gas intake orifice, operation of the engine draws air into the port through the apparatus control tube and air flow restriction means which creates a pressure differential that draws gaseous fuel from the housing into the intake port through the gap between the control tube bottom end and the housing bottom wall, the flow rate of the gaseous fuel being adjustable by repositioning of the control tube so as to adjust the size of the gap.

6. The apparatus of claim 5 wherein said control tube bottom end tapers inwardly.

7. The apparatus of claim 6 wherein said housing bottom wall tapers inwardly about said bottom opening.

8. The apparatus of claim 5 wherein said adjustable securing means comprises a holddown bar mounted atop said control tube.

9. In an internal combustion engine having an intake port, the improvement comprising means for introducing a mixture of gaseous fuel and air into said intake port which comprises a housing having a top wall formed with a top opening and a bottom wall formed with a bottom opening mounted to said intake port, fastening means for fastening said housing securely to said intake port, means through which gaseous fuel may be introduced into said housing, a control tube mounted in said housing top wall opening with an end located within said housing closely adjacent to and spaced from said housing bottom wall adjacent said bottom opening, and air flow restriction means for restricting air flow through said control tube whereby an airstream passing through the control tube and into the intake port within the housing draws gaseous fuel from the housing between the control tube end and the housing bottom wall into the intake port.

10. The improvement of claim 9 wherein said control tube end tapers inwardly.

11. The improvement of claim 9 wherein said control tube is threaded into said housing top wall top opening.

12. The improvement of claim 9 wherein said restriction means comprises a honeycomb plate mounted within said control tube.

* * * * *